United States Patent Office 3,840,472
Patented Oct. 8, 1974

3,840,472
METHOD FOR PREPARING A HYDROTREATING CATALYST
Joseph Dennis Colgan and James John Healy, Fort Worth, Tex., assignors to American Cyanamid Company, Stamford, Conn.
No Drawing. Continuation-in-part of abandoned application Ser. No. 154,697, June 18, 1971. This application Oct. 17, 1972, Ser. No. 298,228
Int. Cl. B01j 11/06
U.S. Cl. 252—435
3 Claims

ABSTRACT OF THE DISCLOSURE

A novel ultra-stable impregnation solution useful in the preparation of a hydrogenation catalyst and a process for preparing the same is given whereby promoters including cobalt and/or nickel are dissolved in phosphoric acid solution and thereafter molybdic oxide is added and the solution mixture heated until the molybdic oxide has dissolved therein. Catalyst supports are impregnated with this stable impregnation solution and thereafter dried and calcined.

---

This application is a continuation-in-part of Ser. No. 154,697 filed June 18, 1971 now abandoned.

This invention relates to a stable promoter solution, to the process by which the solution is obtained, and to catalyst material resulting from impregnation of a suitable support with the stable promoter solution. More particularly the invention relates to a promoter solution which consists essentially of molybdic oxide and selected nickel and/or cobalt salts dissolved in an aqueous phosphoric acid solution.

Petroleum feed stocks generally contain minor amounts of sulfur compounds which are recognized as highly undesirable. Hydrodesulfurization is a principal technique by which this undesirable sulfur content may be reduced. Organic sulfur compounds such as mercaptans, thiophenes, and the like are reacted with hydrogen in the presence of a hydrogenation catalyst to convert the sulfur to hydrogen sulfide which may be readily removed. Typically, it has been recognized that cobalt oxide-molybdic oxide-alumina catalysts and nickel oxide-molybdic oxide-alumina catalysts may be effectively employed in the conversion.

Methods for preparing such hydrogenation catalysts principally involve the impregnation of suitable carriers with acid solutions of the desired promoter materials such as cobalt or nickel and molybdenum salts using separate or combined solutions. In producing the impregnated catalysts, many difficulties have been encountered, nearly all of which can be associated with impregnation solutions. For example, highly concentrated impregnation solutions are generally unstable and thus must be prepared in only that amount that is to be used immediately. This makes it necessary in commercial operations to prepare many small batches which are uneconomical and increase the quality control problem. Moreover, because of the nature of the impregnation solution, it is necessary that the porosity of the support be controlled to within narrow limits in order to ensure adequate product density and molybdenum oxide content. It is also known that as the size of support particles increases, the tendency for $MoO_3$ to precipitate during impregnation also increases thus making it difficult to produce larger particles in acceptable form. Additionally, in conventional prior art impregnation solutions, there is a tendency for $MoO_3$ precipitation to occur resulting in molybdenum losses, which can also present pollution problems. The precipitation also increases the potential for equipment fouling.

Since the prior art generally employs nitrate salts of nickel and cobalt in preparing promoter solutions, an additional pollutant source arises from generation of these nitrates as oxides of nitrogen during catalyst activation.

In certain prior art procedures, use is made of ammonium molybdate in preparing the impregnation solution. Such use requires the prior preparation of this ingredient and the various processing steps attendant therewith. Excess presence of ammonium ions in the solution interferes with obtaining a stable solution also containing the group VIII metal compound and phosphoric acid. Accordingly, there is the need for promoter solutions which limit the requirements for ammonium ions and avoid nitrate ions, thereby overcoming the problems associated therewith.

Phosphoric acid solutions containing various promoter salts are characterized by a number of well-known restrictions. The phosphoric acid must be present in an amount sufficient to dissolve the various promoter materials and to maintain their solubility over a substantial time period so that uniform impregnation of these promoters materials may be achieved. In addition, however, phosphoric acid must not be present in the impregnating solution in an amount which upon subsequent calcination of the catalyst material will adversely affect the activity and strength of the catalyst in use and upon repeated regenerations to any substantial extent.

In accordance with the present invention, there is provided a stable promoter solution, useful for impregnating catalyst supports, consisting essentially of molybdic oxide and at least one compound of a group VIII metal of the periodic table selected from nickel carbonate, cobalt carbonate, nickel hydroxide, cobalt hydroxide, nickel acetate, cobalt acetate, nickel formate, cobalt formate, and nickel oxide, said nickel oxide in its solid form having a surface area of at least about one square meter per gram, dissolved in aqueous phosphoric acid, said promoter solution having a content of about 0.3 to 2.5 moles per liter of phosphorus, about 0.4 to 1.5 moles per liter of said group VIII metal, and about 1 to 3 moles per liter of molybdenum therein.

There is also provided a process for preparing the above solution which comprises mixing with an aqueous phosphoric acid solution in any order molybdic oxide and at least one compound of a group VIII metal selected from nickel hydroxide, cobalt hydroxide, nickel carbonate, cobalt carbonate, nickel acetate, cobalt acetate, nickel formate, cobalt formate, and nickel oxide, said nickel oxide in its solid form having a surface area of at least about one square meter per gram, heating the resulting mixture to effect solution of the molybdic oxide and group VIII metal compound and thereafter adjusting the solution concentration to provide from about 0.3 to 2.5 moles per liter of phosphorus, from about 0.4 to 1.4 moles per liter of said group VIII metal, and from about 1 to 3 moles per liter of molybdenum therein.

In one embodiment of the solution preparation process, the group VIII metal compound is first dissolved in the aqueous phosphorus acid and the molybdic oxide is then dissolved in the resulting solution. By this technique, the desired levels of promoter ingredients can be obtained directly as solution occurs. In a second embodiment the molybdic oxide is first dissolved in the aqueous phosphoric acid solution and then addition of group VIII metal salt and adjustment of the concentration levels of the various ingredients is effected, the addition of said group VIII metal compound being made either before concentration adjustment or as a result thereof. Thus, after the amount of molybdic oxide employed is completely dissolved, the group VIII metal compound is added and dissolved. The resulting solution may be within the concentration limits of the present invention or not at this point. Adjustment of the concentration levels must be made if they are outside the limits of the invention and addition of the group VIII metal compound may be before the necessary adjustments or may be all or part of such adjustment. Adjustment of the concentration levels may also be made to obtain varying levels within the concentration limits specified.

There is further provided a process for preparing a catalyst material which comprises impregnating an alumina support with the promoter solution of the present invention and thereafter drying and calcining the impregnated support so as to obtain a catalyst material having a composition of about 2% to 6% of said group VIII metal in oxide form about 8% to 22% of molybdenum in oxide form, about 1% to 5% phosphorus, and the balance alumina, the percentages being by weight based on the weight of the calcined catalyst material. There is also provided the catalyst material obtained by the process of impregnation using the promoter solution of the present invention. The support to be impregnated may be a calcined extrudate or a spray-dried hydrated alumina which is extruded, or otherwise shaped, subsequent to impregnation and theerafter dried and calcined.

The present invention provides a highly stable solution of promoter materials which solution is free of undesirable nitrate ions which interfere with catalyst activation and give rise to a potential atmospheric pollutant and is limited in content of ammonium ions which can create stability problems with respect to the promoter solution. The stability of the solution is so great that support material impregnated therewith may be aged for one to four hours prior to drying and calcining without adverse effect on the promoter solution. The promoter solution when impregnated onto a suitable support provides a catalyst material of greater activity than comparable prior art materials. These results are surprising for several reasons. First, it is surprising that only the specified nickel and/or cobalt salts can be used to provide the stable solutions. Next, it is surprising that nickel oxides of only specified values of surface area in solid form can be effectively employed in preparing the stable promoter solution. Further, it is surprising that when the specified group VIII metal compound is first dissolved in aqueous phosphoric acid, the resulting solution can aid in the dissolution of molybdic oxide. Finally, it is surprising that the catalyst material resulting from impregnation of a suitable support with the promoter solution of the present invention can possess increased activity.

The promoter solution of the present invention consists essentially of molybdic oxide, at least one of specified group VIII metal compounds, and phosphoric acid dissolved in water. The amount of the specified ingredients present in the solution is such as to provide a concentration of about 0.3 to 2.5 moles per liter of phosphorus, about 0.4 to 1.5 moles per liter of group VIII metal, and about 1 to 3 moles per liter of molybdenum. The solution is devoid of any content of nitrate ions. Although it is preferred to eliminate ammonium ions from the solution completely, it is possible for ammonium ions to be present up to about 1.5 moles per liter without adverse effect on stability of the promoter solution.

It is greatly preferred to employ molybdic oxide as the sole source of molybdenum in the promoter solution. However, it is also possible to use phosphomolybdic acid ($H_3PO_4 \cdot 12MoO_3 \cdot 12H_2O$) as the source of molybdenum since this compound contains about 85% of $MoO_3$. It is also possible to use ammonium molybdate and ammonium dimolybdate as a partial source of molybdenum as long as the restriction as to the concentration of ammonium ions in the resulting promoter solution is observed. It is generally convenient to employ reagents other than molybdic oxide per se for purpose of increasing the concentration of molybdenum beyond that initially obtained by dissolution of molybdic oxide. It is, of course, unnecessary to employ any reagent other than molybdic oxide to obtain solutions of the range of molybdenum concentrations specified.

The metals of group VIII of the periodic table used in the promoter solution are limited to nickel and cobalt. The compounds of these metals that can effectively be employed are nickel hydroxide, cobalt hydroxide, nickel carbonate, cobalt carbonate, nickel acetate, cobalt acetate, nickel formate, cobalt formate and nickel oxides which nickel oxides in solid form have a surface area of at least about one square meter per gram. The group VIII metals may be used singly or in combination and the concentration specified represents the usage of group VIII metal however used, i.e. the actual concentration of nickel, cobalt, or any combination of nickel and cobalt.

Phosphoric acid is the sole acid useful in the promoter solution. Concentrated acid may be appropriately diluted for use or an appropriate form of dilute acid may be used directly.

In preparing the promoter solution of the present invention, it is necessary to dissolve the various ingredients in water under conditions which will effect dissolution and provide the specified concentrations of ingredients. Several alternative procedures may be employed to achieve solutions of high stability.

A first procedure involves dissolving the group VIII metal compound in aqueous phosphoric acid and adding molybdic oxide to the solution thus obtained. Surprisingly, the presence of the group VIII metal compound in the phosphoric acid solution not only reduces the length of time required to dissolve a given amount of molybdic oxide but also increases the total amount of molybdic oxide which can be dissolved therein. Although this procedure is generally preferred because it enables the specified concentration ranges of ingredients to be obtained by direct addition of the required amounts of actual ingredients, it is to be understood that the required amounts of ingredients do not have to be added directly, as will develop.

In carrying out this first procedure, the group VIII metal compound is dissolved in aqueous phosphoric acid. Any temperature in the range of about 0° C. to 100° C. may be employed but it is generally preferred to use a temperature of about 50° C. for convenience in time. Agitation is preferred but is not required. After this solution is obtained, molybdic oxide is added to form a mixture. The mixture is then heated at a temperature in the range of about 85° C. to reflux until complete dissolution of molybdic oxide occurs. The solution is then adjusted in concentration as may be necessary so as to provide from about 0.3 to 2.5 moles per liter of phosphorus, from about 0.4 to 1.5 moles per liter of group VIII metal, and from about 1 to 3 moles per liter of molybdenum therein. This adjustment may be done by stripping off water from the solution obtained to increase the concentrations of all ingredients to within the desired ranges. It may also be done by adding water to decrease the concentrations of all ingredients to within the desired ranges. Dilution or stripping may also be carried out to vary all concentrations within the specified ranges. Additionally, selected addition of one or more ingredients may be made to increase the concentrations thereof to be within the specified range or to vary concentrations within the ranges.

The term "adjusting," as that term is employed in the present specification and claims, is intended to include dilution, stripping, and selective ingredient addition to place the concentration levels of ingredients within the specified ranges as well as to vary the concentration levels within the specified ranges. Adjusting of the concentration levels may not be necessary in those instances where the initial amounts of ingredients taken directly provides a solution within the range of concentration values specified, but adjusting of the concentration levels can still be made, if desired, to alternative values within the range.

An alternative procedure for preparation of the promoter solution is that of dissolving molybdic oxide in aqueous phosphoric acid solution, adding group VIII metal compound thereto, and adjusting the concentration of ingredients to the specified levels. Adjustment of the concentration of ingredients can be by the various means discussed previously in conjunction with the first procedure. If adjustment by stripping off water is to be employed, the addition of group VIII metal compound may be made prior to or subsequent to said stripping. In this procedure, the amount of molybdic oxide that can be dissolved in the aqueous phosphoric acid is limited and adjustments to obtain high concentration levels within the specified range are generally required. Stripping off water is the preferred procedure, although other suitable means can be employed, as previously indicated.

The promoter solutions of the present invention are capable of providing from about 8% to 22% molybdenum, 2% to 6% of nickel, 2% to 6% of cobalt, or 2% to 6% of any combination of nickel and cobalt, and 1% to 5% of phosphorus, the metals being expressed as their oxides, on a suitable support, the percentages being by weight based on the total weight of the activated impregnated support.

As the substrate, base, or carrier materials upon which the promoter solution is to be impregnated are included calcined formed alumina, calcined alumina extrudates, spray dried hydrated alumina powder, and silica-modified alumina with up to about 20% silica modification by weight based on the total weight of silica-alumina. A catalyst suitable for use in accordance with the present invention may be prepared by precipitation of a water solution of a water-soluble aluminium compound which may be either an aluminum salt such as aluminum sulfate, aluminum nitrate, aluminum chloride and the like, or an alkali metal aluminate such as sodium or potassium aluminate. Typically, such alumina may be prepared in accordance with the description appearing in U.S. Pat. No. 2,980,632, Malley et al., issued Apr. 18, 1961. According to a procedure set forth therein, an aluminum precipitate is filtered and washed to reduce alkali metal and salt anions such as sulfate when present to acceptable levels, i.e. below 0.02% for alkali metal and 0.5% for sulfate, based on the weight of alumina, and is thereafter spray dried. As in the case of the alumina described therein, it is preferred that the dried alumina contemplated for use in this invention be characterized by a surface area when calcined of at least 150 square meters per gram, a pore volume of at least 0.5 cubic centimeters per gram (usually 0.5 to 1.0), and an apparent bulk density (ABD) within the range of about 0.2 and about 0.6 grams per cubic centimeter prior to forming as by extrusion and impregnation.

Typically, formed and impregnated catalyst particles such as extrudates will be characterized by a surface area of from about 200 to 300 m.$^2$/gm., a pore volume of about 0.5 to 0.9 cc./gm., and ABD of from about 0.5 to 0.8 gm./cc. Typically, a final catalyst, i.e. a catalyst after impregnation and calcination of the impregnated base, will have a surface area of from about 150 to 275 m.$^2$/gm., a pore volume of from about 0.4 to 0.8 cc./gm., and an ABD of from about 0.5 to 1.0 gm./cc.

The base material may be pelletized as by extruding or by means of a pill-forming device and may typically be prepared as ⅛", ¹⁄₁₆", or ¹⁄₃₂" diameter extrudates. The base or carrier may be calcined prior to pelletizing or may be calcined after pelletizing; normally an important aspect is that the base be calcined prior to impregnation.

By the term "alumina" and other similar expressions is meant substantially pure alumina or alumina containing minor amounts as for example up to about 20 weight percent of such known stabilizers as silica, based on the total weight of stabilized alumina. The alumina may be employed in any effective and desired form.

When a solution in the concentration range indicated above is used to impregnate suitable supports materials, the catalyst material will have a composition of between about 2% and 6% CoO and/or NiO, about 8% to 22% MoO$_3$, and about 1% to 5% phosphorus, with the balance being support and the percentages being by weight based on the total weight of the activated catalyst. Catalysts of this composition are very effective hydrogenation catalysts. A particularly effective catalyst contains about three percent CoO or NiO, nineteen percent molybdenum oxide, three percent phosphorus, and the balance alumina.

The nickel and cobalt promoters in this invention are added in the form of the salts specified hereinabove. While adding these salts first in preparing the promoter solution enables more efficient molybdic oxide digestion, higher molybdenum concentrations, and more stable solutions to be obtained, the specified salts provide additional advantages in that upon calcination no pollution problems arise upon release of product gases to the atmopshere or appropriate treatment.

After the catalyst material is impregnated with the promoter solution, the catalyst material is calcined normally at a temperature generally between about 800 and 1300° F. to activate the catalyst and convert the metal content to the corresponding oxides.

The invention specifically provides the following advantages:

(1) The impregnation solution is stable at high promoter concentrations and is, therefore, suitable for impregnation of low pore volume supports to produce catalysts with high promoter loadings.

(2) The impregnation solution yields uniform promoter distribution on the support.

(3) The impregnation of support results in little or no selective loss of promoter.

(4) The impregnation solution avoids undesirable polutants.

(5) The impregnation solution avoids any exotherm in activation of the impregnated support.

(6) The impregnation solution provides catalysts of improved activity.

(7) The process of solution preparation avoids many of the steps required by prior art processes.

The invention is more fully illustrated by the examples which follow wherein all parts and percentages are by weight unless otherwise specifically designated.

EXAMPLE 1

A. Preparation of Promoter Solution

Fifteen hundred thirty pounds of water and five hundred thirty pounds of 75% H$_3$PO$_4$ were charged to an agitated tank equipped with a steam-heated jacket. To this aqueous phosphoric acid solution were added 200 pounds of nickel carbonate. The mix was heated to 200° F. effecting solution of the nickel carbonate and 275 pounds of molybdic oxide were added. In approximately four hours a clear solution formed with complete dissolution of molybdic oxide resulting. The solution obtained has a concentration of about 2.5 moles per liter of phosphorus, 1.0 moles per liter of nickel, and 1.2 moles per liter of molybdenum.

B. Impregnation of Support

The solution obtained in part A above in the amount of 436 pounds of solution was employed to impregnate 400 pounds of calcined alumina extrudates having a pore volume of 0.75 cc./gm. The extrudates were charged to an impregnator presenting a tumbling bed of extrudates and the solution was sprayed thereon. The extrudates were then dried at 250° F. and calcined at 900° F. Theoretical composition of the catalyst product was 19.3% MoO$_3$, 3.2% P, 3.0% NiO, and the balance support. Actual composition by analysis was 19.5% MoO$_3$, 3.2% P, and 2.9% NiO, indicating little or no selective loss of promoter.

C. Catalyst Evaluation

The activity of the catalyst obtained in part B above for nitrogen removal was measured by charging 200 cc. of the calcined catalyst to a reactor and passing at a rate of 400 cc./minute a gas oil mixture containing 1.18% sulfur and 1950 p.p.m. nitrogen in admixture with hydrogen. The reactor was controlled at a temperature of 725° C. with a pressure of 1400 p.s.i.g. Product samples were collected and measured against a standard which had an arbitrary value of 100. The activity of the catalyst prepared in part B above was 150 demonstrating the advantage obtained by use of the impregnating solution prepared in part A above.

EXAMPLE A (COMPARATIVE)

This example illustrates a current procedure, not of the invention, used for manufacture of hydrodesulfurization catalyst.

A. Preparation of Promoter Solution

An impregnation solution is prepared by adding 185 pounds of ammonium molybdate solution (28% $MoO_3$), 75 pounds of 75% $H_3PO_4$, and then 75 pounds of ammonium dimolybdate (78% $MoO_3$). One hundred pounds of nickel nitrate solution (15.5% NiO) are then added with 5 pounds of water.

B. Impregnation of Support

Four hundred pounds of the alumina support of Example 1, part B, are impregnated with the solution prepared in A above following the procedure of Example 1, part B. Theoretical composition of the catalyst product is 19.3% $MoO_3$, 3.1% P, 2.7% NiO, and the balance support. The actual composition is 17.0% $MoO_3$, 3.0% P, and 2.7% NiO, indicating a selective loss of $MoO_3$. Despite the fact that the impregnation solution is clear and stable, on impregnation some $MoO_3$ separates from the solution and is deposited on the surface of the extrudates. During subsequent drying-activation operations, this $MoO_3$ separates from the catalyst product as a $MoO_3$-rich dust and copious fumes of oxides of nitrogen are generated.

EXAMPLE 2

Four hundred fifty grams of water were mixed with seventy six grams of 75% $H_3PO_4$. To this acid solution sixty eight grams of molybdic oxide were added and the mixture was brought to reflux temperature (ca. 100° C.) and held there. After five hours a clear solution was obtained. To this solution were added 29.2 grams of nickel carbonate. The solution was then concentrated to 281 cc. by stripping of water. There were then added 55.4 grams of ammonium dimolybdate (78% $MoO_3$). A clear solution having the same Ni, Mo, and P concentrations as Example 1 was obtained.

This example shows an alternative procedure of promoter solution preparation according to the present invention.

EXAMPLE 3

Four hundred and fifty grams of water were mixed with 76 grams of 75% $H_3PO_4$. To this acid solution were added 29.2 grams of nickel carbonate and the mixture was heated to reflux during which period solution of the nickel carbonate was effected. There were then added 68 grams of molybdic oxide and after 1.5 hours of reflux complete solution of the molybdic oxide was accomplished.

This example shows that the rate of $MoO_3$ digestion in the dilute acid is increased when the metal carbonate is present.

EXAMPLE B (COMPARATIVE)

Two hundred twenty two grams of water were mixed with 76 grams of 75% $H_3PO_4$ and 111 grams of molybdic oxide were added. The mixture was heated to reflux (ca. 100° C.) and held under reflux for 24 hours. Complete solution of $MoO_3$ failed to be effected throughout this time period.

This shows the difficulty in attempting to obtain a solution of molybdic oxide of high concentration directly.

EXAMPLE 4

Two hundred twenty two grams of water were mixed with 76 grams 75% $H_3PO_4$ and 29.2 grams of nickel carbonate were added. After solution was effected, 111 grams of molybdic oxide were added. The mixture was heated to reflux (ca. 100° C.) and held at reflux for 3 hours whereupon a clear solution resulted.

This demonstrates that $MoO_3$ can be digested in $H_3PO_4$ at a high concentration if the metal carbonate is present prior to addition of the molybdic oxide.

EXAMPLE 5

Four hundred and ninety five grams of water were mixed with fourteen grams of 75% $H_3PO_4$. To this dilute acid 34.7 grams of cobalt carbonate were added. The solution resulting was heated to reflux and 77.0 grams of molybdic oxide were added. A clear solution was obtained in one hour with complete solution of $MoO_3$. This example demonstrates the preparation of solutions with a low P/Mo, P/Co ratio.

EXAMPLE 6

To an agitated tank equipped with a steam-heated jacket, 1805 pounds of water and 208 pounds of 75% $H_3PO_4$ were charged. To this acid solution 165 pounds of cobalt carbonate were added and after solution occurred 535 pounds of molybdic oxide were added. The mixture was heated to 210° F. and after 1½ hours at this temperature a clear solution resulted with complete solution of the $MoO_3$.

Five hundred thirty pounds of the above solution were intensively mixed with 500 pounds of spray dried hydrated alumina (75% $Al_2O_3$) and 50 pounds of water to form an extrusion feed mix. This mix was extruded to form cylindrical strands which were oven dried at 250° F. and calcined at 1200° F. The calcined product had the following properties: percent $MoO_3$=15; percent CoO=3; percent P=1.4; bulk density=35 lbs./ft.$^3$; diameter=0.068 inch; pore volume=0.77 cc./gm.

This example demonstrates the utility of the promoter solution of the invention in the preparation of Co-Mo catalysts via impregnation of hydrated alumina powder.

EXAMPLE 7

To 65 grams of water were added 23.2 grams of 85% $H_3PO_4$. To the acid solution were added 19.7 grams of nickel acetate to prepare a clear solution. To the solution were added 34.0 grams of molybdic oxide. The mixture was heated to 90° C. After holding the temperature at 90° C. for 2½ hours, a clear solution resulted with complete solution of the $MoO_3$.

EXAMPLE 8

To 70.5 grams of water were added 23.2 grams of 85% $H_3PO_4$. To this acid solution were added 14.9 grams of nickel formate to provide a clear solution. To this solution were added 34.0 grams of molybdic oxide after which the solution was heated to 90° C. After holding the solution at 90° C. for 3¾ hours a clear, stable solution was obtained.

EXAMPLE C (COMPARATIVE)

To 65 grams of water were added 23.2 grams of 85% $H_3PO_4$. To the acid solution were added 21.1 grams of nickel sulfate to provide a clear solution. To this solution were added 34.0 grams of molybdic oxide after which the mix was heated at a temperature of 90° C. for 8 hours. A clear solution was not obtained.

This example shows the ineffectiveness of nickel sulfate in providing the desired promoter solution.

EXAMPLES 9–10

Following the procedure of Examples 7 and 8, solutions employing equivalent amounts of cobalt acetate (Example 9) and of cobalt formate (Example 10) were prepared. Clear solutions of the added molybdic oxide occurred in approximately 3 hours in each example.

EXAMPLE 11

The procedure of Example 1A, 1B, and 1C was followed in every material detail except that in the promoter solution preparation there were substituted 120 grams of nickel oxide of surface area of 70 square meters per gram for the 200 grams of nickel carbonate. A clear promoter solution was obtained in 4 hours. In parts B and C of this example a catalyst of similar composition and activity was obtained.

EXAMPLE 12

Sixteen hundred fifty pounds of water and 190 pounds of 75% $H_3PO_4$ were charged to an agitated tank. To this acid solution were added 100 pounds of nickel oxide of surface area of 70 square meters per gram. After solution occurred there were added 480 pounds of molybdic oxide. The mix was heated to 190° F. and after 3 hours at this temperature a clear solution resulted. Four hundred fifteen pounds of this solution were employed to impregnate 400 pounds of alumina extrudates as employed in Example 1. The impregnated extrudates were subsequently dried and calcined as in Example 1 to produce a catalyst containing 16.1% $MoO_3$, 3.1% NiO and 1.4% P.

EXAMPLE 13

A series of nickel oxide preparations was prepared by thermal treatment of nickel carbonate to provide the solid with a wide range of surface areas.

Dilute acid solutions were prepared by adding 23.2 grams of 85% $H_3PO_4$ to 79.5 grams of water. To these solutions were individually added 6.0 grams of the nickel oxide preparations and after solution occurred, 34.0 grams of $MoO_3$ were added to each solution. The mixes were agitated at a temperature of 90° C. for from 3 to 7 hours. The thermal treatment conditions, surface areas, and solution properties are summarized in Table I. These tests indicate that nickel oxide in its solid form should have a surface area of at least about 1 square meter per gram to facilitate preparation of the phosphoric acid-molybdic oxide solutions.

EXAMPLE 14

Water was stripped from a portion of the solution prepared in Example 6 above, increasing the specific gravity from 1.21 to 1.30. Seventy ccs. of the stripped solution were added to 100 grams of calcined alumina extrudates (pore volume=0.75 cc./gm.). The impregnated extrudates were dried at 100° C. and then calcined at 1100° F. The catalyst material obtained exhibited excellent activity.

EXAMPLE 15

The procedure of Example 2 is repeated in every material detail except that the addition of nickel carbonate is made subsequent to stripping rather than prior thereto. A similar solution is obtained.

EXAMPLE D (COMPARATIVE)

With 76 grams of 75% $H_3PO_4$ were mixed 209 grams of water and 29.2 grams of nickel carbonate. To the resulting solution was added 35.3 grams of $MoO_3$ and the mix was refluxed for 90 minutes to effect complete solution. To the solution were then added 97 grams of ammonium dimolybdate (78% $MoO_3$). Approximately the first 80% of the ammonium dimolybdate went into solution, but after addition of all the dimolybdate a clear solution was not obtained. On standing, massive precipitation occurred. This demonstrates that solution stability is adversely affected by excessive presence of ammonium ions therein.

Additional experimentation along the same lines indicated above established the fact that solution stability is good when the concentration of ammonium ions is less than about 1.5 moles per liter.

We claim:

1. A process for preparing a stable promoter solution which comprises first dissolving in an aqueous phosphoric acid solution at least one compound of a group VIII metal selected from nickel hydroxide, cobalt hydroxide, nickel carbonate, cobalt carbonate, nickel acetate, cobalt acetate, nickel formate, cobalt formate, and nickel oxide, said nickel oxide in its solid form having a surface area of at least one square meter per gram, and then dissolving molybdic oxide in the resulting solution by heating at a temperature of about 85° C. to reflux until complete dissolution of molybdic oxide occurs to provide from about 0.3 to 2.5 moles per liter of phosphorus, from about 0.4 to 1.5 moles per liter of said group VIII metal, and from about 1 to 3 moles per liter of molybdenum therein.

2. The process of Claim 1 wherein the group VIII metal compound is nickel carbonate.

3. The process of Claim 1 wherein the group VIII metal compound is cobalt carbonate.

TABLE I

| Nickel carbonate treatment temperature, ° F.—16 hours treatment: | NiO surface area, m.²/gm. | Solution appearance |
|---|---|---|
| 900 | 35 | Clear green solution obtained in 3½ hours. |
| 1,300 | 6 | Green solution with trace of grey sediment after heating for 7 hours. |
| 1,500 | 2.5 | Green solution with small amount of grey sediment after heating for 7 hours. |
| 1,800 | 0.6 | Yellow solution with a considerable quantity of grey sediment after heating for 5½ hours. |

References Cited

UNITED STATES PATENTS

| 3,232,887 | 2/1966 | Pessimisis | 252—435 |
| 3,287,280 | 11/1966 | Colgan et al. | 252—435 |
| 2,980,632 | 4/1961 | Malley et al. | 252—465 |
| 3,617,528 | 11/1971 | Hilfman | 252—465 |
| 3,755,196 | 8/1973 | Mickelson | 252—435 |

PATRICK P. GARVIN, Primary Examiner

W. J. SHINE, Assistant Examiner

U.S. Cl. X.R.

252—465, 466 J, 428